US012795658B2

(12) United States Patent
Zorgui et al.

(10) Patent No.: US 12,795,658 B2
(45) Date of Patent: Nov. 10, 2026

(54) SELECTIVELY REPURPOSING COMMUNICATION RESOURCES FOR RADIO FREQUENCY (RF) SENSING

(71) Applicant: QUALCOMM Incorporated, San Diego, CA (US)

(72) Inventors: Marwen Zorgui, San Diego, CA (US); Ahmed Attia Abotabl, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/534,457

(22) Filed: Dec. 8, 2023

(65) Prior Publication Data

US 2025/0193877 A1 Jun. 12, 2025

(51) Int. Cl.

*H04W 72/1268* (2023.01)
*H04W 72/0457* (2023.01)
*H04W 72/566* (2023.01)
*H04W 74/0808* (2024.01)

(52) U.S. Cl.

CPC ... *H04W 72/1268* (2013.01); *H04W 72/0457* (2023.01); *H04W 72/566* (2023.01); *H04W 74/0808* (2013.01)

(58) Field of Classification Search

CPC ......... H04W 72/1268; H04W 72/0457; H04W 72/566; H04W 74/0808; H04W 24/08; H04W 72/21

See application file for complete search history.

(56) References Cited

U.S. PATENT DOCUMENTS 12,245,277 B2 * 3/2025 Li ............................. H04L 1/08
12,402,123 B2 * 8/2025 Yang ..................... H04W 72/23
2017/0188391 A1 * 6/2017 Rajagopal ......... H04W 28/0284
2020/0107365 A1 * 4/2020 Tsai .................. H04W 72/0446
2020/0404691 A1 * 12/2020 Wu ....................... H04W 76/15
2021/0014874 A1 * 1/2021 Deogun ............ H04W 74/0808
2021/0051646 A1 * 2/2021 Maaref ................. H04W 72/02
2022/0183046 A1 * 6/2022 Xue ...................... H04W 72/23
2022/0256519 A1 * 8/2022 Jeon ...................... G01S 7/0235

(Continued)

FOREIGN PATENT DOCUMENTS

WO 2023179437 A1 9/2023

OTHER PUBLICATIONS

3GPP TS 38.455 16.3.0 release 16 (Year: 2021).*

(Continued)

*Primary Examiner* — Ayaz R Sheikh

(74) *Attorney, Agent, or Firm* — Seyfarth Shaw LLP

(57) ABSTRACT

A method for wireless communication by a user equipment (UE) includes receiving, from a network node, an uplink (UL) grant that grants resources for a set of UL transmission communication occasions. The method also includes transmitting, to the network node, a first message indicating that a subset of UL transmission occasions of the set of UL transmission occasions will be skipped. The method still also includes transmitting one or more sensing signals, associated with a sensing operation, on respective communication resources allocated to one or more UL transmission occasions of the subset of UL transmission occasions.

30 Claims, 7 Drawing Sheets

400

(56) References Cited

U.S. PATENT DOCUMENTS

| | | | | |
|---|---|---|---|---|
| 2023/0328731 | A1* | 10/2023 | Elshafie | H04W 72/25 370/329 |
| 2024/0314787 | A1* | 9/2024 | Xu | H04W 72/1268 |
| 2025/0016726 | A1 | 1/2025 | Du et al. | |

OTHER PUBLICATIONS

ERICSSON: "On ISAC", 3GPP TSG RAN Meeting #102, RP-232751, 3rd Generation Partnership Project, Mobile Competence Centre, 650, Route Des Lucioles, F-06921, Sophia-Antipolis Cedex, France, vol. TSG RAN, No. Edinburgh, Scotland; Dec. 11, 2023-Dec. 15, 2023, Dec 4, 2023, XP052557422, pp. 1-6, The Whole Document.

Huawei, et al., "XR Enhancements in Rel-19", 3GPP TSG RAN Meeting #102, RP-233315, 3rd Generation Partnership Project, Mobile Competence Centre, 650, Route Des Lucioles, F-06921, Sophia-Antipolis Cedex, France, vol. TSG RAN, No. Edinburgh, Scotland; Dec. 11, 2023-Dec. 15, 2023, Dec 4, 2023, XP052557867, 12 Pages, The Whole Document.

International Search Report and Written Opinion—PCT/US2024/054998—ISA/EPO—Feb. 14, 2025.

LG Electronics Inc: "Remaining Issues on CG enhancement for XR", 3GPP TSG-RAN WG2 Meeting #124, R2-2313460, 3rd Generation Partnership Project, Mobile Competence Centre, 650, Route Des Lucioles, F-06921, Sophia-Antipolis Cedex, France, vol. Ran WG2, No. Chicago, US; Nov. 13, 2023-Nov. 17, 2023, Nov. 3, 2023, XP052535860, 4 Pages, The Whole Document.

* cited by examiner

SELECTIVELY REPURPOSING COMMUNICATION RESOURCES FOR RADIO FREQUENCY (RF) SENSING

FIELD OF THE DISCLOSURE

The present disclosure relates generally to wireless communication, and more specifically to selectively repurposing communication resources for radio frequency (RF) sensing.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In some cases, a communication node, such as a UE, a TRP, or a network node, may perform radio frequency (RF) sensing operations including transmitting one or more sensing signals and monitoring respective reflections of the one or more sensing signals. The RF sensing operations may be performed to identify one or more characteristics of an environment within a signal range of the communication node. For example, the communication node may perform RF sensing for various applications, such as (but not limited to) blind spot detection, sensing-assisted navigation, intruder detection, and/or positioning. The RF sensing may involve monostatic sensing, bistatic sensing, or multi-static sensing.

SUMMARY

In some aspects of the present disclosure, a method for wireless communication by a user equipment (UE) includes receiving, from a network node, an uplink (UL) grant that grants communication resources for a set of UL transmission occasions. The method also includes transmitting, to the network node, a first message indicating that a subset of UL transmission occasions of the set of UL transmission occasions will be skipped. The method further includes transmitting one or more sensing signals, associated with a sensing operation, on respective communication resources allocated to one or more UL transmission occasions of the subset of UL transmission occasions.

Other aspects of the present disclosure are directed to a UE. The UE includes one or more processors, and one or more memories coupled with the one or more processors and storing instructions operable, when executed by the one or more processors, to cause the UE to receive, from a network node, a UL grant that grants communication resources for a set of UL transmission occasions. Execution of the instructions also cause the UE to transmit, to the network node, a first message indicating that a subset of UL transmission occasions of the set of UL transmission occasions will be skipped. Execution of the instructions further cause the UE to transmit one or more sensing signals, associated with a sensing operation, on respective communication resources allocated to one or more UL transmission occasions of the subset of UL transmission occasions.

In still other aspects of the present disclosure, a non-transitory computer-readable medium with program code recorded thereon for wireless communication by a UE is disclosed. The program code is executed by one or more processors and includes program code to receive, from a network node, a UL grant that grants communication resources for a set of UL transmission occasions. The program code also includes program code to transmit, to the network node, a first message indicating that a subset of UL transmission occasions of the set of UL transmission occasions will be skipped. The program code further includes program code to transmit one or more sensing signals, associated with a sensing operation, on respective communication resources allocated to one or more UL transmission occasions of the subset of UL transmission occasions.

Other aspects of the present disclosure are directed to an apparatus for wireless communication by a UE. The apparatus includes means for receiving, from a network node, a UL grant that grants communication resources for a set of UL transmission occasions. The apparatus also includes means for transmitting, to the network node, a first message indicating that a subset of UL transmission occasions of the set of UL transmission occasions will be skipped. The apparatus further includes means for transmitting one or more sensing signals, associated with a sensing operation, on respective communication resources allocated to one or more UL transmission occasions of the subset of UL transmission occasions.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
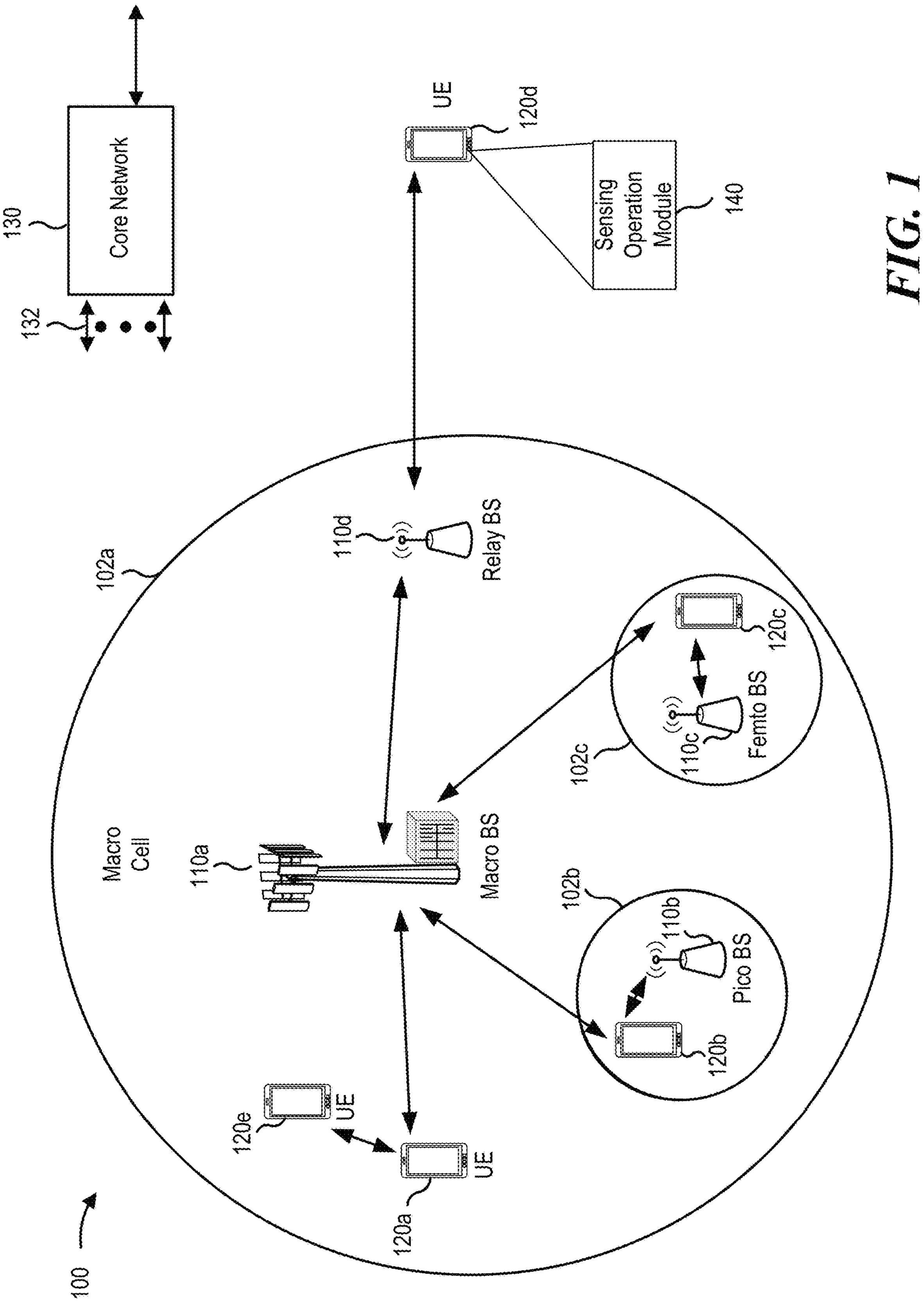
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Typically, a user equipment (UE) receives a physical uplink shared channel (PUSCH) uplink (UL) grant that schedules a set of PUSCH UL occasions. Specifically, the PUSCH UL grant may allocate resources for the UE to transmit data at each PUSCH UL occasion of the set of PUSCH UL occasions. Each PUSCH UL occasion may be referred to as a UL transmission occasion (hereinafter used interchangeably). The UL grant may be a configured grant (CG) or a dynamic grant. In some examples, the UE may not use one or more UL transmission occasions of the set UL transmission occasions. For example, the UE may skip the one or more UL transmission occasions if there is no data in a UL buffer of the UE. Each of the one or more UL transmission occasions that the UE does not use may be referred to as a skipped UL transmission occasion. The skipped UL transmission occasions may also be referred to as unused transmission occasions (UTOs) (hereinafter, used interchangeably). In some such examples, the UE may transmit, to the network node, a message indicating that the UE will not use the one or more UL transmission occasions to be skipped. The message may be an uplink control information (UCI) message, such as a UTO-UCI message.

In some cases, a communication node, such as a UE, a TRP, or a network node, may perform radio frequency (RF) sensing by transmitting sensing signals and monitoring reflections of the transmitted sensing signals. The RF sensing may also be referred to as a sensing operation (hereinafter used interchangeably). A sensing operation may identify one or more characteristics of an environment within a signal range of the communication node. For example, the communication node may perform the sensing operation for various applications, such as (but not limited to) blind spot detection, sensing-assisted navigation, intruder detection, and/or positioning. The sensing operation may involve monostatic sensing, bistatic sensing, or multi-static sensing. For monostatic sensing, a same UE, such as a connected vehicle, may transmit one or more sensing signals and monitor the reflections of the one or more sensing signals. The UE may derive measurements in accordance with monitoring the reflections of the one or more sensing signals. In such examples, the UE may be configured with full-duplex capabilities. For bistatic sensing and multi-static sensing, a first UE may transmit one or more sensing signals, and one or more other nodes, such as other UEs and/or transmit and receive points (TRPs), may monitor for the reflections of the one or more sensing signals and derive sensing measurements based on receiving the reflections of the one or more sensing signals.

While a network node may typically allocate, to a UE, resources for a sensing operation, such sensing resources may be limited, thereby reducing a quantity of sensing occasions.

Various aspects of the present disclosure are directed to selectively using respective communication resources allocated to one or more skipped UL transmission occasions for a sensing operation. In some examples, a UE may receive, from a network node, a UL grant, such as a PUSCH UL grant, that allocates communication resources for a set of UL transmissions, each one of the UL transmissions may be performed at a respective UL transmission occasion. The UL grant may be a configured grant or a dynamic grant. The UE may determine to skip at least a subset of UL transmission occasions from a set of UL transmission occasions in accordance with a UL transmission buffer being empty or a sensing operation having a higher priority than one or more UL transmission occasions. In such examples, the UE may transmit, to the network node, a message indicating that the subset of UL transmission occasions from the set of UL transmission occasions associated with the UL grant will be skipped. In some such examples, the message may be a configured grant UCI message or a dynamic UCI message. The UE may then transmit one or more sensing signals, associated with a sensing operation, on respective communication resources allocated to one or more skipped UL transmission occasions of the subset of skipped UL transmission occasions. Transmitting the one or more sensing signals on the respective communication resources allocated to one or more skipped UL transmission occasions may increase the quantity of sensing occasions.

Particular aspects of the subject matter described in this disclosure can be implemented to realize one or more of the following potential advantages. In some examples, the described techniques, such as using communication resources associated with skipped UL transmission occasions for sensing operations, may improve sensing operations and resource utilization. For example, by selectively using communication resources associated skipped UL transmission occasions for sensing operations, the UE may increase the quantity of sensing operations. The increase in the quantity of sensing operations may be beneficial in environments where sensing resources are limited. Additionally, such techniques may reduce a total amount of communication resources scheduled specifically, by the network node, for sensing operations, such that the network node may allocate these communication resources for other communication operations. Furthermore, the techniques allow the UE to dynamically switch between a UL transmission and a sensing operation based on a current environment of the UE. This adaptability may be beneficial for a variety of dynamic tasks, such as blind spot detection or automotive navigation, where a sensing operation may be prioritized over one or more UL transmissions.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a sensing operation module 140. For brevity, only one UE 120*d* is shown as including the sensing operation module 140. The sensing operation module 140 may perform various operations, such as operations associated with the process 700.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
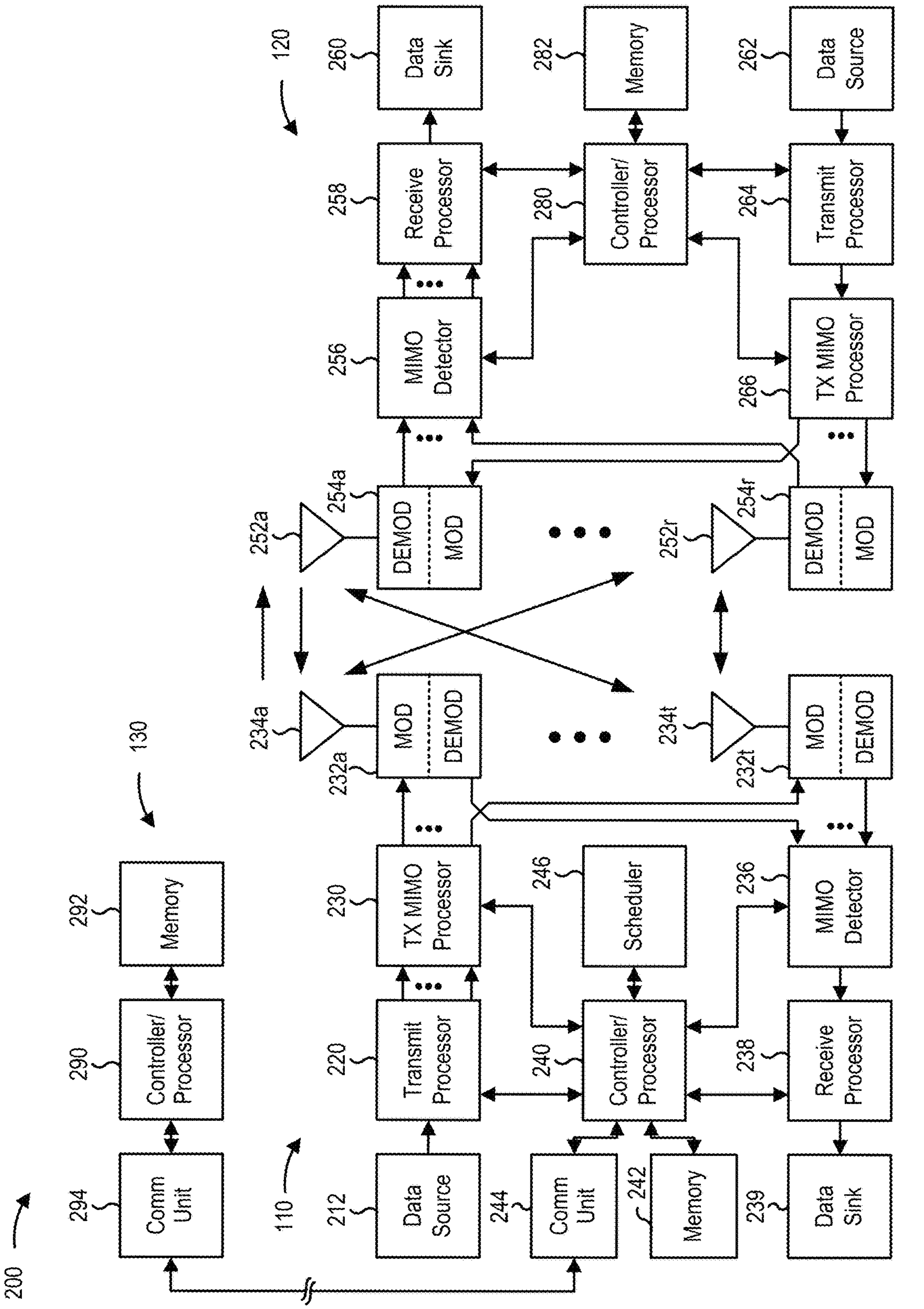
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general $T \geq 1$ and $R \geq 1$.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with selectively using skipped UL transmission occasions for a sensing operation, as described in more detail elsewhere. For example, the controller/processor 240 of the base station 110, the controller/processor 280 of the UE 120, and/or any other component(s) of FIG. 2 may perform or direct operations of, for example, the processes of FIG. 7 and/or other processes as described. Memories 242 and 282 may store data and program codes for the base station 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
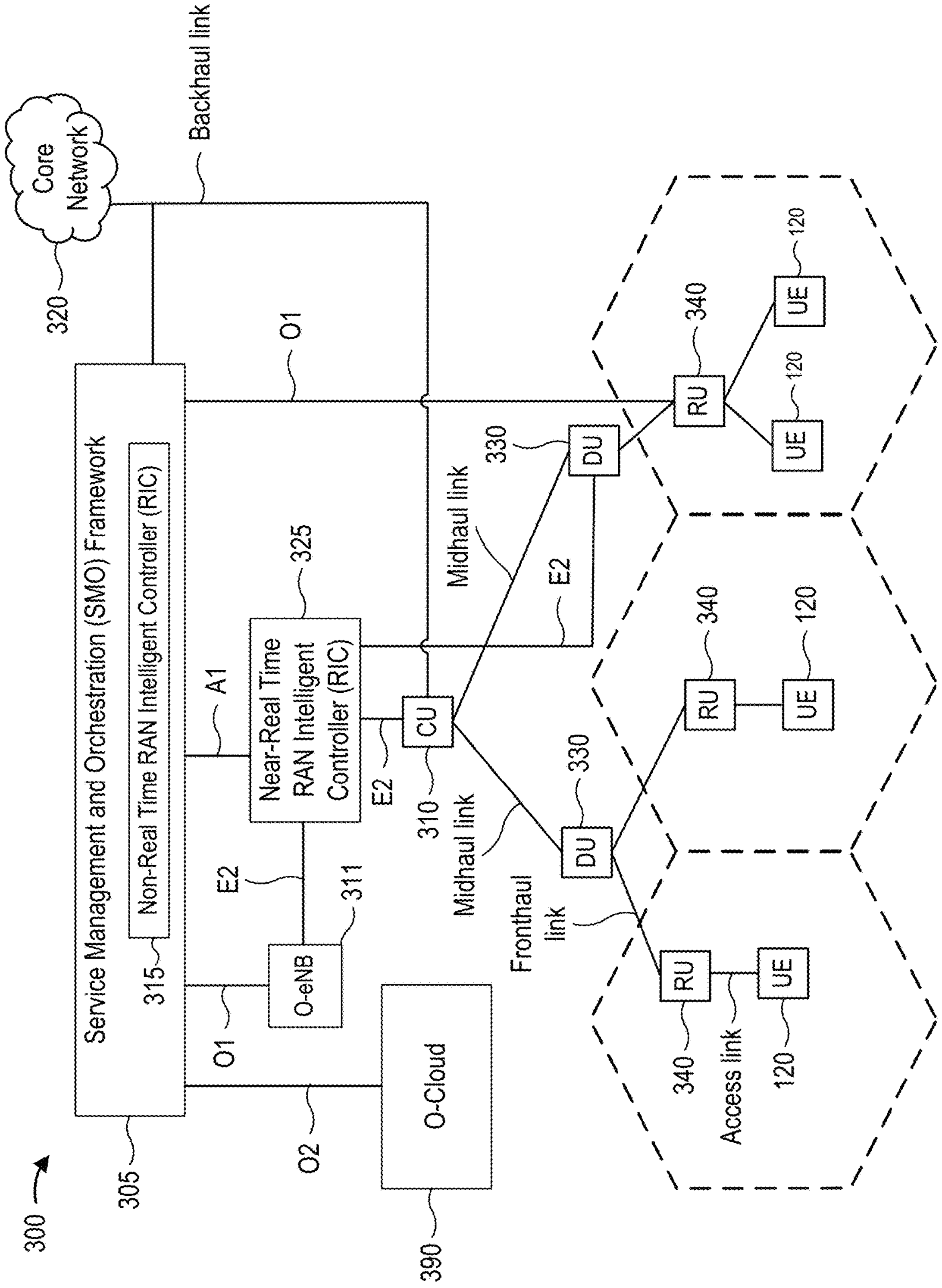
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via 01) or via creation of RAN management policies (such as A1 policies).

As discussed, in most cases, a network node may allocate, to a UE, resources for a sensing operation. Still, such sensing resources may be limited, thereby reducing a quantity of sensing occasions. The UE may increase the quantity of sensing occasions by transmitting one or more sensing signals, associated with the sensing operation, on respective resources allocated to one or more skipped UL transmission occasions.

Various aspects of the present disclosure are directed to selectively using respective resources allocated to one or more skipped UL transmission occasions for a sensing operation. In some examples, a capability to use the skipped UL transmission occasions for the sensing operation may be expressly or implicitly enabled by the network node. In some such examples, the use of skipped UL transmission occasions for the sensing operation may be enabled per UL grant (e.g., PUSCH UL grant). For example, a field in a UL grant configuration may indicate whether the granted UL transmission occasions are available for RF sensing. The UL grant configuration may be transmitted to the UE, by the network node, prior to transmitting the UL grant. In some examples, the per UL grant configuration may be dependent on a bandwidth part (BWP). For example, the UE may use the skipped UL transmission occasions for the sensing operations on some BWPs, while other BWPs may not permit the use of skipped UL transmission occasions for the sensing operation. In some other examples, the use of skipped UL transmission occasions for the sensing operation may be enabled based on a configuration of the UL grant. For example, the sensing operation may be permitted on the skipped UL transmission occasions if the UL grant includes a wideband allocation, defined by an RRC configuration, that is greater than a bandwidth threshold.

Figure 4:
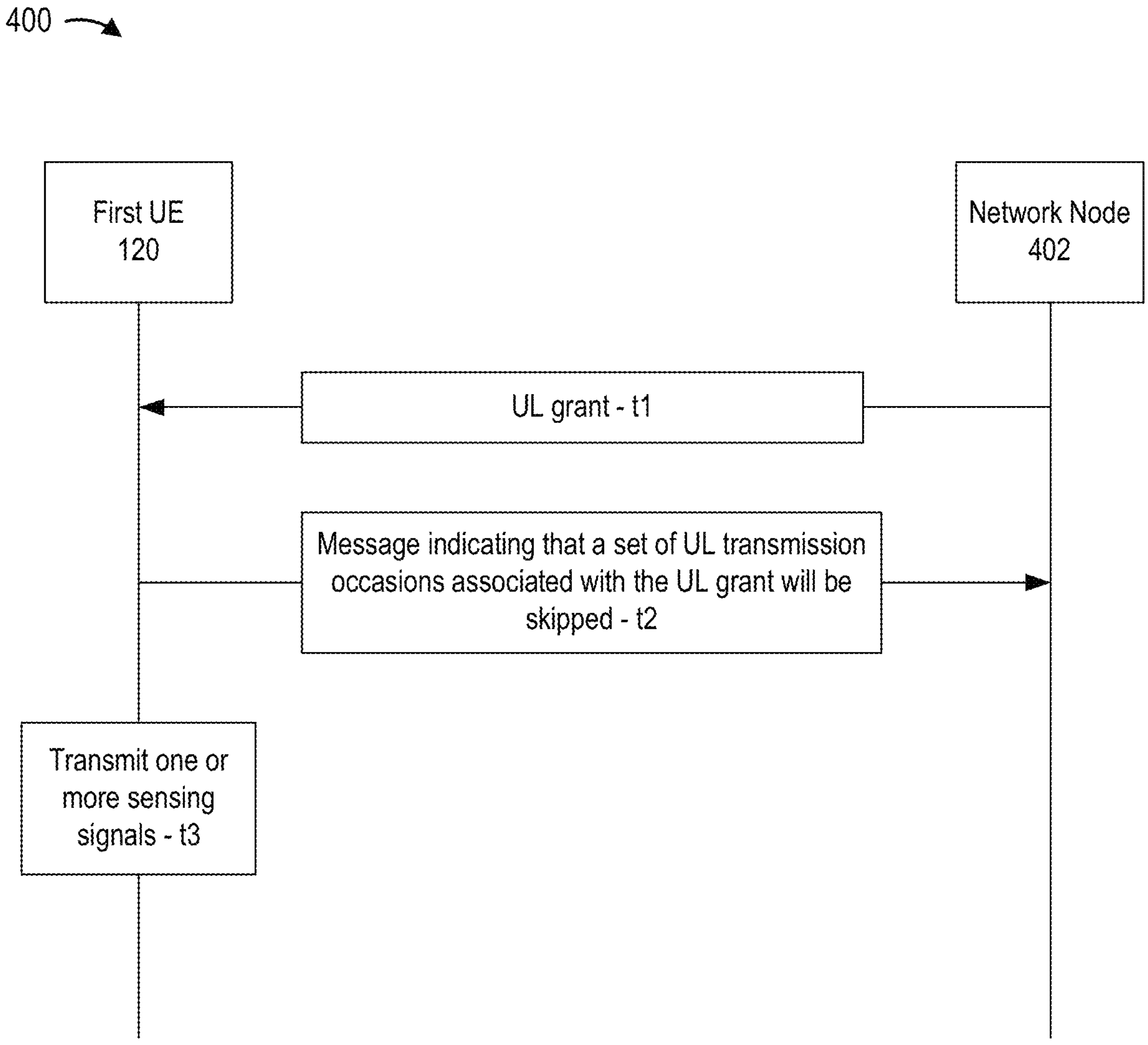
FIG. 4 is a timing diagram illustrating an example of a first UE using skipped uplink (UL) transmission occasions for a sensing operation, in accordance with various aspects of the present disclosure.

FIG. 4 is a timing diagram 400 illustrating an example of a first UE 120 using skipped UL transmission occasions for a sensing operation, in accordance with various aspects of the present disclosure. In the example of FIG. 4, the first UE 120 may be served by a network node 402. The network node 402 may be an example of a base station 110 as described with reference to FIGS. 1 and 2, or a CU 310, DU 330, or RU 340 as described with reference to FIG. 3. As shown in the example of FIG. 4, at time t1, the first UE 120 may receive, from the network node 402, a UL grant, such as a PUSCH UL grant. The UL grant may allocate communication resources for a set of UL transmission occasions. The communication resources may also be referred to as resources. The UL grant may be a CG or a dynamic grant.

As shown in the example of FIG. 4, at time t2, the first UE 120 transmits a message indicating that a subset of UL transmission occasions of the set of UL transmission occasions will be skipped. The message transmitted at time t2 may be transmitted prior to the UE skipping the subset of UL transmission occasions. Additionally, the message transmitted at time t2 may be referred to as a UL skipping indication message. A quantity of UL transmission occasions in the subset may be less than or equal to a quantity of UL transmission occasions in the set of UL transmission occasions. As discussed, a UE may skip each of the subset of UL transmission occasions based on the UE UL buffer being empty or a sensing operation having a higher priority than one or more UL transmissions. Accordingly, in some examples, the UE may drop one or more UL transmissions and use UL transmission occasions associated with the one or more dropped UL transmissions for a sensing operation. In some examples, the message transmitted at time t2 may indicate whether one or more of the subset of UL transmission occasions will be used for the sensing operation. In some examples, each one of the subset of UL sensing occasions may be used for the sensing operation. In other examples, a quantity of UL sensing occasions used for the sensing operation may be less than a total quantity of UL sensing occasions in the subset of UL sensing occasions.

As shown in the example of FIG. 4, at time t3, the first UE 120 may transmit one or more sensing signals. The one or more sensing signals may be associated with the sensing operation. Furthermore, the one or more sensing signals may be transmitted on one or more UL transmission occasions of the subset of UL transmission occasions (e.g., the skipped UL transmission occasions). The one or more sensing signals may be transmitted in accordance with a sensing signal configuration. In some examples, sensing signal parameters of the sensing signal configuration may be the same as PUSCH parameters of a PUSCH resource configuration. In such examples, the sensing signals may have the same bandwidth, power, and/or transmission configuration indicator (TCI) (e.g., beam) as the PUSCH UL transmissions. In other examples, one or more sensing signal parameters may be different than one or more PUSCH parameters to accommodate one or more qualities of the sensing signals. For example, sensing signals may use more power, in comparison to PUSCH UL transmissions, given round-trip propagation specifications and higher expected power loss. Therefore, a power level for the sensing signals may be higher than a power level for PUSCH UL transmissions. A maximum power for the sensing signals may be increased by a defined power offset ($\delta_{(p,sensing)}$) relative to the power levels assigned for PUSCH UL transmissions. As another example, beams for sensing signals may be transmitted towards potential targets within the environment, as opposed to towards TRPs. Therefore, one or more beams specified for the sensing signals may be different than one or more beams specified for PUSCH UL transmissions.

Additionally, different frequency domain structures may be specified for the sensing signals. In some examples, the sensing signals use a fixed structure, which includes a sensing signal sequence and a frequency comb pattern. In other examples, the first UE 120 may select the frequency domain structure. This flexibility may be useful for monostatic sensing because the network node 402 does not need to be aware of the frequency domain structure of the sensing signals.

In some examples, the sensing operation associated with the one or more sensing signals transmitted at time t3 is a monostatic sensing operation. In other examples, the sensing operation associated with the sensing signals transmitted at time t3 is a bistatic or multi-static sensing operation. In bitstatic and multi-static sensing operations, the one or more sensing signals transmitted at time t3 are measured by one or more TRPs and/or one or more other UE, as opposed to the first UE 120. To enable the one or more other UEs to measure the one or more sensing signals transmitted at time t3, the one or more other UEs need to be aware of the skipped UL transmission occasions. In some examples, a UL grant configuration associated with the UL grant transmitted, by the network node 402, at time t1 may be shared with a group of UEs that include the one or more other UEs. In some such examples, the network node 402 may share the UL grant configuration with the group of UEs over a cellular link (for example, a Uu link). The identity of each UE in the group of UEs may be indicated to the network node by the first UE 120 that transmits the sensing signals at time t3. In other such examples, the first UE 120 may share the UL grant configuration with the group of UEs, prior to transmitting the sensing signals at time t3.

In some examples, when a second UE of the group of UEs receives the UL grant configuration, the second UE may monitor for the UL skipping indication message. The second UE may receive the UL skipping indication message from the network node 402. Alternatively, the first UE 120 may share the UL skipping indication message, with the second UE (as well as other UEs in the group of UEs) via a sidelink channel. In accordance with receiving the UL skipping indication message, the second UE may monitor for one or more sensing signals transmitted by the first UE 120. In some examples, the first UE 120 may configure, via a measurement indication message, the second UE to perform a type of sensing measurement on the one or more sensing signals. The measurement indication message may be transmitted to the second UE by the network node via a cellular link or by the first UE 120 via a sidelink channel. For example, the measurement indication message may be transmitted to the second UE in accordance with a process for transmitting the UL grant configuration to the second UE.

As discussed, in bitstatic and multi-static sensing operations, one or more TRPs may measure the one or more sensing signals transmitted at time t3. In some examples, the network node 402 may use the one or more TRPs to monitor for the sensing signals transmitted by the first UE 120. In some such examples, the first UE 120 may request, from the network node 402, an identity and/or location of each of the one or more TRPs. In some examples, the message (for example, UL skipping indication message) transmitted at time t2 may include a request for the identities of each of the one or more TRPs, as well as a type of sensing measurement (for example, RF sensing measurement type). The network node 402 may share measurements of the sensing signals, obtained by the one or more TRPs, with the first UE 120.

As discussed, in some examples, the first UE 120 may use each one of the subset of UL transmission occasions for a sensing operation. In other examples, a quantity of UL transmission occasions used for the sensing operation is less than a total quantity of UL transmission occasions in the subset of UL transmission occasions.

Figure 5:
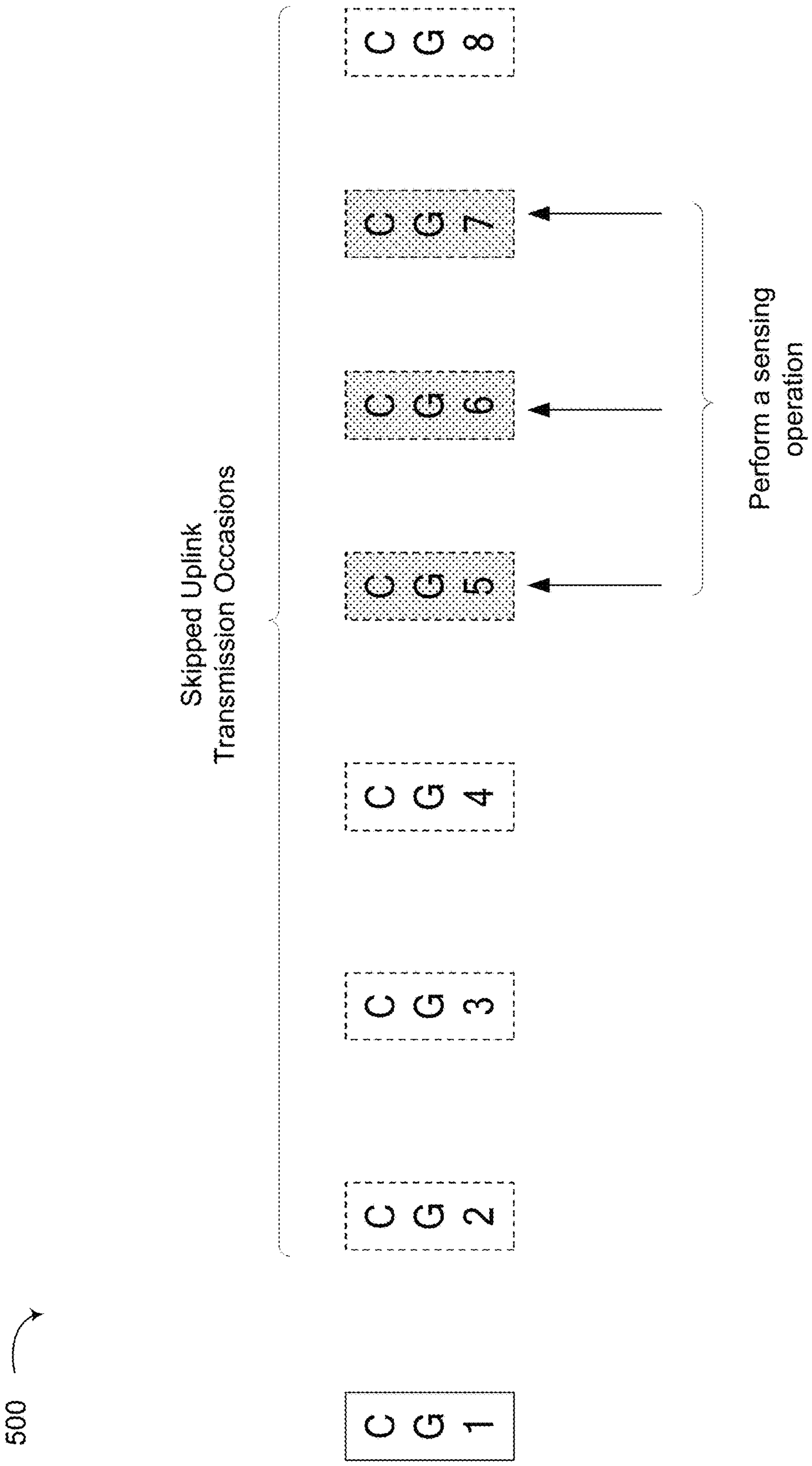
FIG. 5 is a block diagram illustrating an example of using one or more skipped UL transmission occasions for a sensing operation, in accordance with various aspects of the present disclosure.

FIG. 5 is a block diagram illustrating an example 500 of using one or more skipped UL transmission occasions for a sensing operation, in accordance with various aspects of the present disclosure. In the example of FIG. 5, a UL grant (for example, a CG UL grant) may grant eight UL transmission occasions (shown as CG1 to CG8 in FIG. 5) to a UE, such as a UE 120 described with reference to FIGS. 1-4. The UE may skip UL transmission occasions two (CG2) to eight (CG8) (represented as a dashed line in FIG. 5). In the example of FIG. 5, the UE may only use a subset of the skipped UL transmission occasions (CG2 to CG8) for a sensing operation. For example, as shown in FIG. 5, the UE may only use skipped UL transmissions occasions five (CG5), six (CG6), and seven (CG7) for the sensing operation. In other examples (not shown in FIG. 5), the UE may use each of the skipped UL transmission occasions (CG2 to CG8) for a sensing operation. Aspects of the present disclosure are not limited to the number of UL transmission occasions shown in the example of FIG. 5, the UE may be granted additional or fewer UL transmission occasions.

Figure 6:
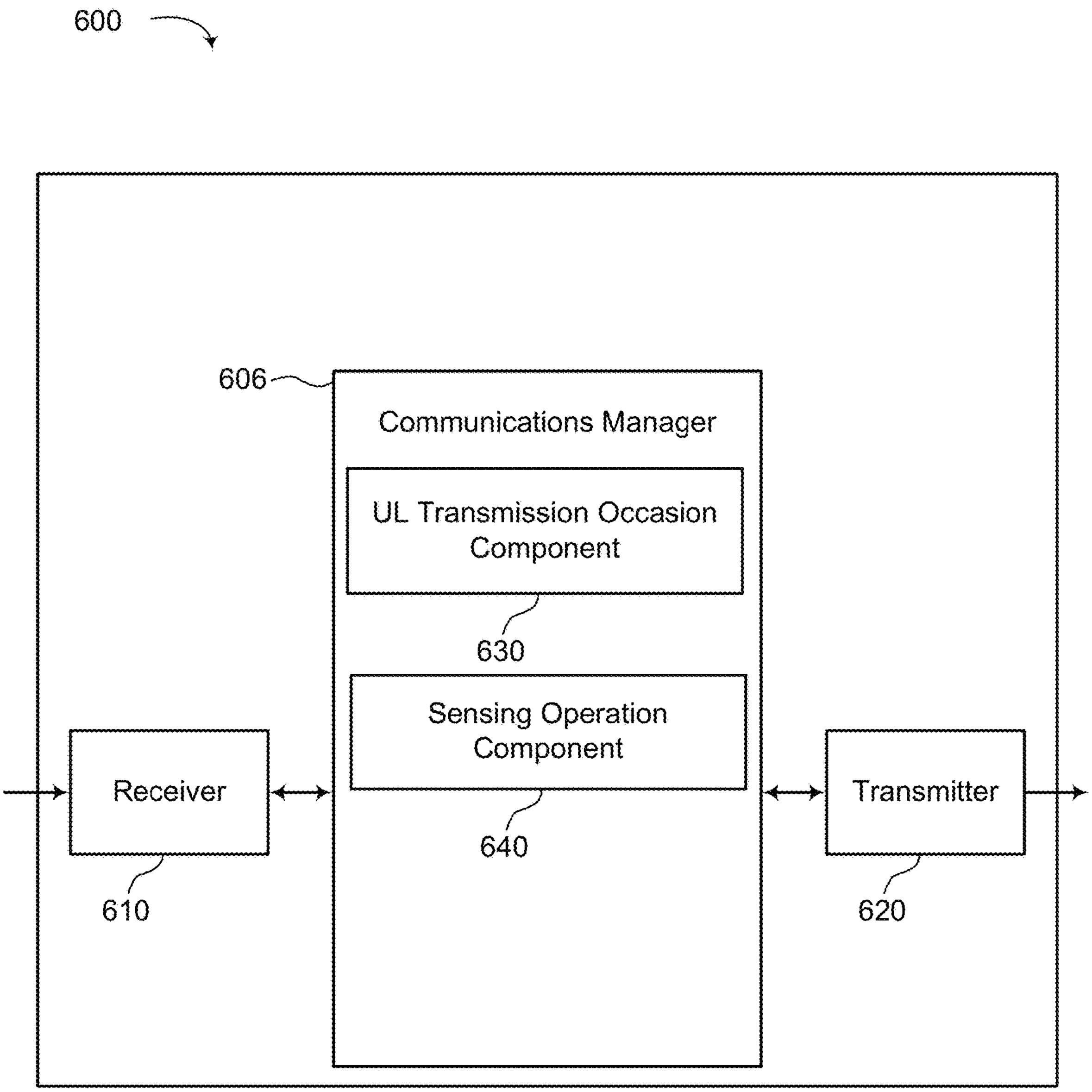
FIG. 6 is a block diagram illustrating an example wireless communication device that supports using skipped UL transmission occasions for a sensing operation, in accordance with some aspects of the present disclosure.

FIG. 6 is a block diagram illustrating an example wireless communication device that supports using skipped UL transmission occasions for a sensing operation, in accordance with some aspects of the present disclosure. The device 600 may be an example of aspects of a UE 120 described with reference to FIGS. 1, 2, 3, and 4. The wireless communications device 600 may include a receiver 610, a communications manager 606, a transmitter 620, a UL transmission occasion component 630, and a sensing operation component 640, which may be in communication with one another (for example, via one or more buses). In some examples, the wireless communications device 600 is configured to perform operations, including operations of the process 700 described below with reference to FIG. 7.

In some examples, the wireless communications device 600 can include a chip, chipset, package, or device that includes at least one processor and at least one modem (for example, a 5G modem, 6G modem, or other cellular modem). In some examples, the communications manager 606, or its sub-components, may be separate and distinct components. In some examples, at least some components of the communications manager 606 are implemented at least in part as software stored in a memory. For example, portions of one or more of the components of the communications manager 606 can be implemented as non-transitory code executable by the processor to perform the functions or operations of the respective component.

The receiver 610 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH), physical uplink control channel (PUCCH), or physical shared control channel (PSCCH)) and data channels (for example, a physical downlink shared channel (PDSCH), physical sidelink shared channel (PSSCH), a physical uplink shared channel (PUSCH)). The other wireless communications devices may include, but are not limited to, a base station 110 described with reference to FIGS. 1, 2, and 4, a DU 330 described with reference to FIG. 3, or a CU 310 described with reference to FIG. 3.

The received information may be passed on to other components of the device 600. The receiver 610 may be an example of aspects of the receive processor 258 described with reference to FIG. 2. The receiver 610 may include a set of radio frequency (RF) chains that are coupled with or otherwise utilize a set of antennas (for example, the set of antennas may be an example of aspects of the antennas 252 described with reference to FIG. 2).

The transmitter 620 may transmit signals generated by the communications manager 606 or other components of the wireless communications device 600. In some examples, the transmitter 620 may be collocated with the receiver 610 in a transceiver. The transmitter 620 may be an example of aspects of the transmit processor 264 described with reference to FIG. 2. The transmitter 620 may be coupled with or otherwise utilize a set of antennas (for example, the set of antennas may be an example of aspects of the antennas 252 described with reference to FIG. 2), which may be antenna elements shared with the receiver 610. In some examples, the transmitter 620 is configured to transmit control information in a PUCCH, PSCCH, or PDCCH and data in a physical uplink shared channel (PUSCH), PSSCH, or PDSCH.

The communications manager 606 may be an example of aspects of the controller/processor 280 described with reference to FIG. 2. The communications manager 606 may include the UL transmission occasion component 630 and the sensing operation component 640. Working in conjunction with the receiver 610, the UL transmission occasion component 630 may receive, from a network node, a UL grant that grants communication resources for a set of UL transmission occasions. In some examples, the UL grant is a PUSCH UL grant and the UL transmission occasions are PUSCH UL transmission occasions. Additionally, the UL transmission occasion component 630 may transmit, to the network node, a first message indicating that a subset of UL transmission occasions of the set of UL transmission occasions will be skipped. Furthermore, working in conjunction with the transmitter 620 and the UL transmission occasion component 630, the sensing operation component 640 may transmit one or more sensing signals, associated with a sensing operation, on respective communication resources allocated to one or more UL transmission occasions of the subset of UL transmission occasions.

Figure 7:
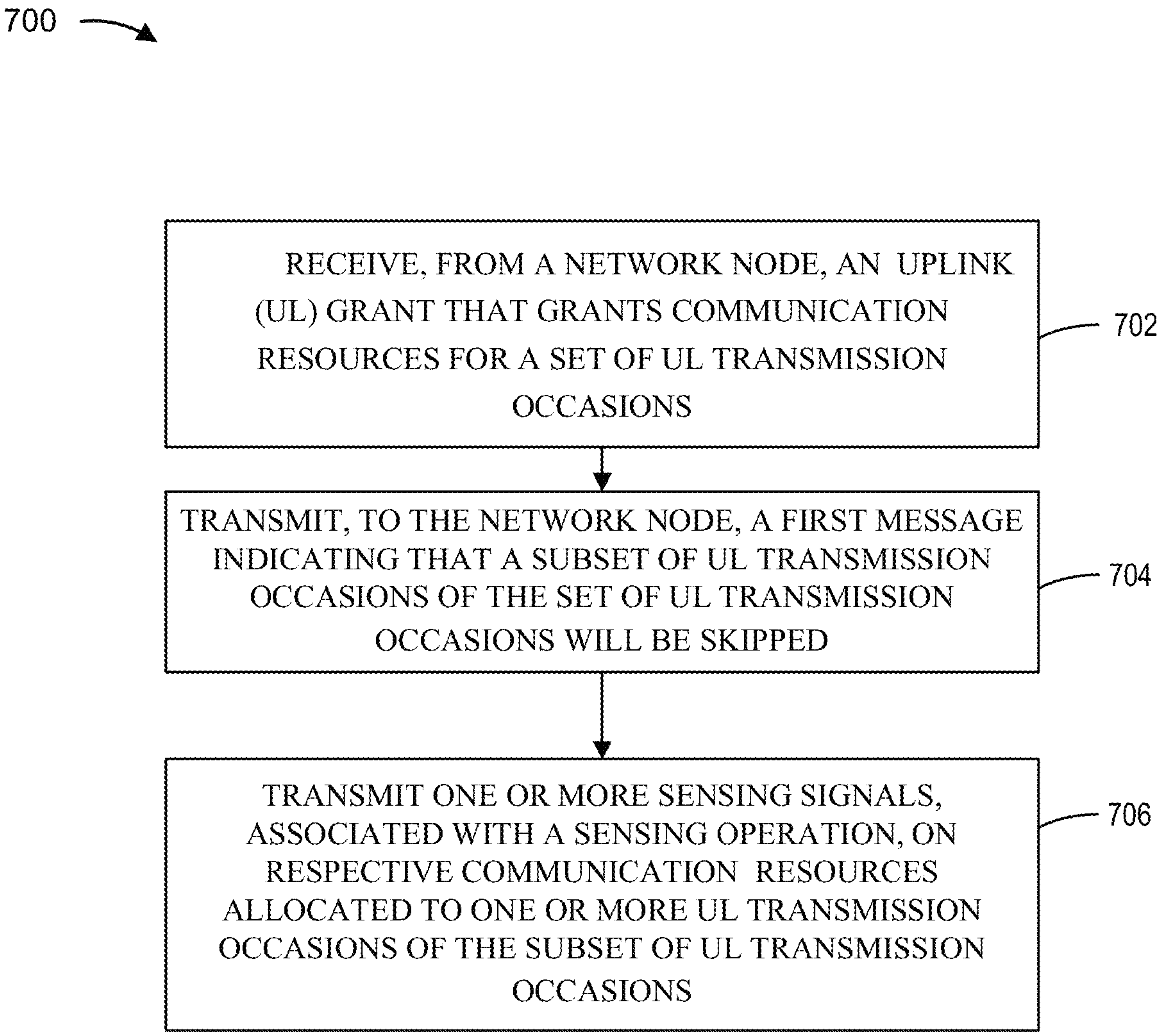
FIG. 7 is a flow diagram illustrating an example process for selectively using skipped UL transmission occasions for a sensing operation, in accordance with various aspects of the present disclosure.

FIG. 7 is a flow diagram illustrating an example process 700 for selectively using skipped UL transmission occasions for a sensing operation, in accordance with various aspects of the present disclosure. The example process 700 may be performed by a UE, such as a UE 120 described with reference to FIGS. 1-4. As shown in the example of FIG. 7, the process 700 may begin at block 702 by receiving, from a network node, a UL grant that grants communication resources for a set of UL transmission occasions. In some examples, the UL grant is a PUSCH UL grant and the UL transmission occasions are PUSCH UL transmission occasions. At block 704, the process 700 includes transmitting, to the network node, a first message indicating that a subset of UL transmission occasions of the set of UL transmission occasions will be skipped. At block 706, the process 700 includes transmitting one or more sensing signals, associated with a sensing operation, on respective resources allocated to one or more UL transmission occasions of the subset of UL transmission occasions.

Implementation examples are described in the following numbered clauses:

Clause 1: A method for wireless communication by a first UE, comprising: receiving, from a network node, an UL grant that grants communication resources for a set of UL transmission occasions; transmitting, to the network node, a first message indicating that a subset of UL transmission occasions of the set of UL transmission occasions will be skipped; and transmitting one or more sensing signals, associated with a sensing operation, on respective communication resources allocated to one or more UL transmission occasions of the subset of UL transmission occasions.

Clause 2: The method of Clause 1, wherein the PUSCH UL grant is a configured grant or a dynamic grant.

Clause 3: The method of any one of Clauses 1 or 2, further comprising receiving, from the network node, a UL grant configuration associated with the PUSCH UL grant.

Clause 4: The method of Clause 3, wherein: a field in the UL grant configuration indicates whether using skipped UL transmission occasions for the sensing operation is enabled; or using the skipped UL transmission occasions for the sensing operation is enabled in accordance with a size of a bandwidth allocated by the UL grant configuration.

Clause 5: The method of Clause 3, wherein the first UE is one UE of a group of UEs that receives the UL grant configuration.

Clause 6: The method of Clause 5, further comprising transmitting, to the network node, a second message identifying each other UE of the group of UEs.

Clause 7: The method of Clause 5, further comprising transmitting the UL grant configuration to each other UE of the group of UEs.

Clause 8: The method of any one of Clauses 1-7, wherein: the first message indicates the one or more UL transmission occasions that will be used for transmitting the one or more sensing signals; and the one or more UL transmission occasions are less than or equal to a total quantity of UL transmission occasions in the subset of UL transmission occasions.

Clause 9: The method of any of one of Clauses 1-8, wherein: a first set of transmission parameters associated with each of the one or more sensing signals are the same as a second set of transmission parameters associated with a resource configuration associated with the set of UL transmission occasions; or one or more first transmission parameters of the first set of transmission parameters are different than one or more second transmission parameters of the second set of transmission parameters.

Clause 10: The method of any one of Clauses 1-9, wherein a frequency domain structure associated with each of the one or more sensing signals is fixed or dynamically configured by the first UE.

Clause 11: The method of any one of Clauses 1-10, wherein the sensing operation is a monostatic sensing operation, a bistatic sensing operation, or a multi-static sensing operation.

Clause 12: The method of any one of Clauses 1-11, further comprising: transmitting, to the network node, a second message requesting an identity and/or a location of a TRP that monitors for sensing signals; and receiving, from the network node, a third message indicating one or more TRP measurements associated with the one or more sensing signals in accordance with transmitting the one or more sensing signals.

Clause 13: The method of Clause 12, wherein the second message is included in the first message.

Clause 14: The method of any one of Clauses 1-13, wherein a UL transmission buffer is not empty.

Clause 15: The method of Clause 14, wherein a first priority associated with UL data in the UL transmission buffer is less than a second priority associated with the sensing operation.

The foregoing disclosure provides illustration and description, but is not intended to be exhaustive or to limit the aspects to the precise form disclosed. Modifications and variations may be made in light of the above disclosure or may be acquired from practice of the aspects.

As used, the term “component” is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles “a” and “an” are intended to include one or more items, and may be used interchangeably with “one or more.” Furthermore, as used, the terms “set” and “group” are intended to include one or more items (for example, related items, unrelated items, a combination of related and unrelated items, and/or the like), and may be used interchangeably with “one or more.” Where only one item is intended, the phrase “only one” or similar language is used. Also, as used, the terms “has,” “have,” “having,” and/or the like are intended to be open-ended terms. Further, the phrase “based on” is intended to mean “based, at least in part, on” unless explicitly stated otherwise.

What is claimed is:

1. A method for wireless communication by a first user equipment (UE), comprising:

receiving, from a network node, an uplink (UL) grant that grants physical uplink shared channel (PUSCH) resources for a set of UL transmission occasions;

transmitting, to the network node, a first message indicating that UL transmissions will not occur on a subset of UL transmission occasions of the set of UL transmission occasions; and transmitting one or more sensing signals, associated with a sensing operation, on respective PUSCH resources allocated to one or more UL transmission occasions of the subset of UL transmission occasions.

2. The method of claim 1, wherein the UL grant is a configured grant or a dynamic grant.

3. The method of claim 1, further comprising receiving, from the network node, a UL grant configuration associated with the UL grant.

4. The method of claim 3, wherein:

a field in the UL grant configuration indicates whether using skipped UL transmission occasions for the sensing operation is enabled; or using the skipped UL transmission occasions for the sensing operation is enabled in accordance with a size of a bandwidth allocated by the UL grant configuration.

5. The method of claim 3, wherein the first UE is one UE of a group of UEs that receives the UL grant configuration.

6. The method of claim 5, further comprising transmitting, to the network node, a second message identifying each other UE of the group of UEs.

7. The method of claim 5, further comprising transmitting the UL grant configuration to each other UE of the group of UEs.

8. The method of claim 1, wherein:

the first message indicates the one or more UL transmission occasions that will be used for transmitting the one or more sensing signals; and the one or more UL transmission occasions are less than or equal to a total quantity of UL transmission occasions in the subset of UL transmission occasions.

9. The method of claim 1, wherein:

a first set of transmission parameters associated with each of the one or more sensing signals are the same as a second set of transmission parameters associated with a resource configuration associated with the set of UL transmission occasions; or one or more first transmission parameters of the first set of transmission parameters are different than one or more second transmission parameters of the second set of transmission parameters.

10. The method of claim 1, wherein a frequency domain structure associated with each of the one or more sensing signals is fixed or dynamically configured by the first UE.

11. The method of claim 1, wherein the sensing operation is a monostatic sensing operation, a bistatic sensing operation, or a multi-static sensing operation.

12. The method of claim 1, further comprising:

transmitting, to the network node, a second message requesting an identity and/or a location of a transmit and receipt point (TRP) that monitors for sensing signals; and receiving, from the network node, a third message indicating one or more TRP measurements associated with the one or more sensing signals in accordance with transmitting the one or more sensing signals.

13. The method of claim 12, wherein the second message is included in the first message.

14. The method of claim 1, wherein a UL transmission buffer is not empty.

15. The method of claim 14, wherein a first priority associated with UL data in the UL transmission buffer is less than a second priority associated with the sensing operation.

16. An a first user equipment (UE), comprising:

one or more processors; and one or more memories coupled with the one or more processors and storing instructions operable, when executed by the one or more processors, to cause the first UE to:

receive, from a network node, an uplink (UL) grant that grants physical uplink shared channel (PUSCH) resources for a set of UL transmission occasions;

transmit, to the network node, a first message indicating that UL transmissions will not occur on a subset of UL transmission occasions of the set of UL transmission occasions; and transmit one or more sensing signals, associated with a sensing operation, on respective PUSCH resources allocated to one or more UL transmission occasions of the subset of UL transmission occasions.

17. The first UE of claim 16, wherein the UL grant is a configured grant or a dynamic grant.

18. The first UE of claim 16, wherein execution of the instructions further cause the first UE to receive, from the network node, a UL grant configuration associated with the PUSCH UL grant.

19. The first UE of claim 18, wherein:

a field in the UL grant configuration indicates whether using skipped UL transmission occasions for the sensing operation is enabled; or using the skipped UL transmission occasions for the sensing operation is enabled in accordance with a size of a bandwidth allocated by the UL grant configuration.

20. The first UE of claim 18, wherein the first UE is one UE of a group of UEs that receives the UL grant configuration.

21. The first UE of claim 20, wherein execution of the instructions further cause the first UE to transmit, to the network node, a second message identifying each other UE of the group of UEs.

22. The first UE of claim 20, wherein execution of the instructions further cause the first UE to transmit the UL grant configuration to each other UE of the group of UEs.

23. The first UE of claim 16, wherein:

the first message indicates the one or more UL transmission occasions that will be used for transmitting the one or more sensing signals; and the one or more UL transmission occasions are less than or equal to a total quantity of UL transmission occasions in the subset of UL transmission occasions.

24. The first UE of claim 16, wherein:

a first set of transmission parameters associated with each of the one or more sensing signals are the same as a second set of transmission parameters associated with a resource configuration associated with the set of UL transmission occasions; or one or more first transmission parameters of the first set of transmission parameters are different than one or more second transmission parameters of the second set of transmission parameters.

25. The first UE of claim 16, wherein a frequency domain structure associated with each of the one or more sensing signals is fixed or dynamically configured by the first UE.

26. The first UE of claim 16, wherein the sensing operation is a monostatic sensing operation, a bistatic sensing operation, or a multi-static sensing operation.

27. The first UE of claim 16, wherein execution of the instructions further cause the first UE to:

transmit, to the network node, a second message requesting an identity and/or a location of a transmit and receipt point (TRP) that monitors for sensing signals; and receive, from the network node, a third message indicating one or more TRP measurements associated with the one or more sensing signals in accordance with transmitting the one or more sensing signals.

28. The first UE of claim 27, wherein the second message is included in the first message.

29. The first UE of claim 16, wherein a UL transmission buffer is not empty.

30. The first UE of claim 29, wherein a first priority associated with UL data in the UL transmission buffer is less than a second priority associated with the sensing operation.

* * * * *